(12) United States Patent
Pan (10) Patent No.: US 12,324,416 B1
(45) Date of Patent: Jun. 10, 2025

(54) BAIT CHASING SYSTEM

(71) Applicant: Zhiyu Pan, Guangxi (CN)

(72) Inventor: Zhiyu Pan, Guangxi (CN)

( * ) Notice: Subject to any disclaimer, the term of this patent is extended or adjusted under 35 U.S.C. 154(b) by 0 days.

(21) Appl. No.: 19/059,055

(22) Filed: Feb. 20, 2025

(30) Foreign Application Priority Data

Feb. 21, 2024 (CN) .......................... 202420320819.5

(51) Int. Cl.
*A01K 15/02* (2006.01)
(52) U.S. Cl.
CPC .................................. *A01K 15/025* (2013.01)
(58) Field of Classification Search
CPC ....... A01K 15/025; A01K 89/08; A63H 13/02
USPC ........................................................ 119/707
See application file for complete search history.

(56) References Cited

U.S. PATENT DOCUMENTS

| | | | | |
|---|---|---|---|---|
| 3,382,609 A | * | 5/1968 | Neanhouse ............ | A63H 33/26 473/576 |
| 3,727,583 A | * | 4/1973 | Muraro ................ | A01K 15/025 119/711 |
| 5,947,790 A | * | 9/1999 | Gordon .............. | B65H 75/4486 242/390.8 |
| 6,398,147 B1 | * | 6/2002 | Fredrickson ......... | B65H 75/305 242/390.8 |
| 7,631,617 B1 | * | 12/2009 | Tsengas ............... | A01K 15/025 119/707 |
| 10,271,519 B2 | * | 4/2019 | Pennington ............ | B65H 75/42 |
| 2007/0289550 A1 | * | 12/2007 | Huang ................. | A01K 15/025 119/707 |
| 2010/0236496 A1 | * | 9/2010 | Comerford .......... | A01K 15/025 119/707 |

\* cited by examiner

*Primary Examiner* — Yvonne R Abbott-Lewis (57) ABSTRACT

A bait chasing system includes a driving device. The driving device is provided with a first movement window. The bait chasing system further includes a flexible bait line. The flexible bait line is used for connecting a bait. The flexible bait line is wound around the driving device and is continuously rotatable around the driving device. The first movement window is configured for allowing the flexible bait line to drive the bait to freely pass through when the flexible bait line rotates around the driving device.

20 Claims, 5 Drawing Sheets

BAIT CHASING SYSTEM

CROSS-REFERENCE TO RELATED APPLICATIONS

The application claims priority of Chinese patent application CN202420320819.5, filed on Feb. 21, 2024, which is incorporated herein by reference in its entireties.

TECHNICAL FIELD

The present invention relates to the field of pet toys, particularly to a bait chasing system for pets.

BACKGROUND ART

In traditional bait chasing systems for pets, rigid lines or cables are typically used as media to connect a driving device and a bait. However, this design has some obvious flaws. Firstly, the movement pattern of the rigid lines or cables is relatively single and lacks natural smoothness, which may reduce pets' interest in a chasing game. Secondly, the rigid lines or cables are prone to breakage or wear, especially during prolonged use or frequent bait replacement, which may increase the failure rate of the systems. In addition, the traditional bait chasing systems for pets also face difficulties in dealing with entanglement and knotting issues. Due to the hardness and non-bendability of the rigid lines or cables, they are easily tangled or knotted during rotation, which not only affects the smooth operation of the systems but may also cause injury to pets or damage to the systems.

In order to solve the above problems, a new bait chasing system is provided in the present invention. A bait line of the system not only has higher durability and reliability, but also can simulate a more natural and smooth bait movement pattern, thereby improving the interactivity and fun of the chasing game.

SUMMARY

In order to overcome the shortcomings of the prior art, a bait chasing system is provided in the present invention. A bait line of the system not only has higher durability and reliability, but also can simulate more natural and smooth bait movement patterns, thereby improving the interactivity and fun of a chasing game.

A technical solution adopted by the present invention to solve its technical problem is as follows.

A bait chasing system is provided in the present invention, including a driving device. The driving device is provided with a first movement window. The bait chasing system further includes a flexible bait line. The flexible bait line is used for connecting a bait. The flexible bait line is wound around the driving device and is continuously rotatable around the driving device. The first movement window is configured for allowing the flexible bait line to drive the bait to freely pass through when the flexible bait line rotates around the driving device.

As an improvement of the present invention, a length range of the flexible bait line is 1 mm-1500000 mm.

As an improvement of the present invention, a width range of the flexible bait line is 0.01 mm-10 mm.

As an improvement of the present invention, the flexible bait line is a nylon bait line, a hemp bait line, or a polyester bait line.

As an improvement of the present invention, the bait is detachably connected to the flexible bait line.

As an improvement of the present invention, the bait is a nylon plastic bait, a fabric bait, a plush bait, or a bagged bait.

As an improvement of the present invention, a weight range of the bait is 0.1 g-5000 g.

As an improvement of the present invention, the bait is a long strip shaped bait, a spherical bait, a cylindrical bait, a triangular bait, or a polygonal bait.

As an improvement of the present invention, the bait is a pendant bait.

As an improvement of the present invention, the driving device includes a motor and a driving wheel. The motor is capable of driving the driving wheel to rotate.

As an improvement of the present invention, the motor is provided with an output shaft. The motor is arranged inside the driving wheel, and the output shaft is connected to the driving wheel, so that the motor drives the driving wheel to rotate.

As an improvement of the present invention, the motor is a brushless motor.

As an improvement of the present invention, the brushless motor includes a stator component. The stator component includes at least one stator core and a stator winding wound around the stator core.

As an improvement of the present invention, a permanent magnet is arranged on an inner side wall of the driving wheel. A magnetic field generated by the stator winding drives the permanent magnet to rotate, so that the permanent magnet drives the driving wheel to rotate.

As an improvement of the present invention, the driving device further includes a driving housing. The driving wheel is arranged inside the driving housing. The first movement window for allowing the flexible bait line to drive the bait to freely pass through is provided between the driving wheel and the driving housing.

As an improvement of the present invention, a first circumferential groove is defined in an outer side wall of the driving wheel. The first circumferential groove is used for fixing the flexible bait line that rotates around the driving wheel when the driving wheel rotates.

As an improvement of the present invention, the driving housing is provided with at least one first position limiting blocking plate. A first position limiting space is surrounded and formed between the first position limiting blocking plate and the first circumferential groove. The first position limiting space is used for limiting movement of the flexible bait line along a trajectory of the first circumferential groove.

As an improvement of the present invention, the bait chasing system further includes at least one transmission device. The flexible bait line is coupled with the driving device and the transmission device to form an annular structure, so that the flexible bait line is continuously rotatable around the driving device and the transmission device.

As an improvement of the present invention, the transmission device is provided with a second movement window. The second movement window is configured for allowing the flexible bait line to drive the bait to freely pass through when the flexible bait line is continuously rotatable around the driving device and the transmission device.

As an improvement of the present invention, the transmission device includes a transmission housing and a transmission wheel arranged inside the transmission housing. A second circumferential groove is defined in an outer side wall of the transmission wheel. The second circumferential groove is used for fixing the flexible bait line that rotates around the transmission wheel when the transmission wheel rotates. The transmission housing is also provided with at least one second position limiting blocking plate. A second position limiting space is surrounded and formed between the second position limiting blocking plate and the second circumferential groove. The second position limiting space is used for limiting movement of the flexible bait line along a trajectory of the second circumferential groove.

Beneficial effects of the present invention are as follows. The bait chasing system includes the driving device. The driving device is provided with the first movement window. The bait chasing system further includes the flexible bait line. The flexible bait line is used for connecting the bait. The flexible bait line is wound around the driving device and is continuously rotatable around the driving device. The first movement window is configured for allowing the flexible bait line to drive the bait to freely pass through when the flexible bait line rotates around the driving device. The flexible bait line not only has higher durability and reliability, but can also simulate a more natural and smooth bait movement pattern, thereby enhancing the interactivity and fun of the chasing game.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-5, a bait chasing system 100 disclosed in the present invention includes a driving device 1000. The driving device 1000 is provided with a first movement window 1001. The bait chasing system 100 further includes a flexible bait line 2000. The flexible bait line 2000 is used for connecting a bait 3000. The flexible bait line 2000 is wound around the driving device 1000 and is continuously rotatable around the driving device 1000. The first movement window 1001 is configured for allowing the flexible bait line 2000 to drive the bait 3000 to freely pass through when the flexible bait line 2000 rotates around the driving device 1000. In this embodiment, the use of the flexible bait line 2000 can reduce the risk of damage caused by frequent bending and friction, and extend a service life of the system. In addition, the design of the first movement window 1001 allows the bait 3000 to freely pass through when the flexible bait line 2000 rotates, which not only ensures the smooth operation of the system, but also makes the replacement of the bait 3000 and the maintenance of the system easier.

Figure 1:
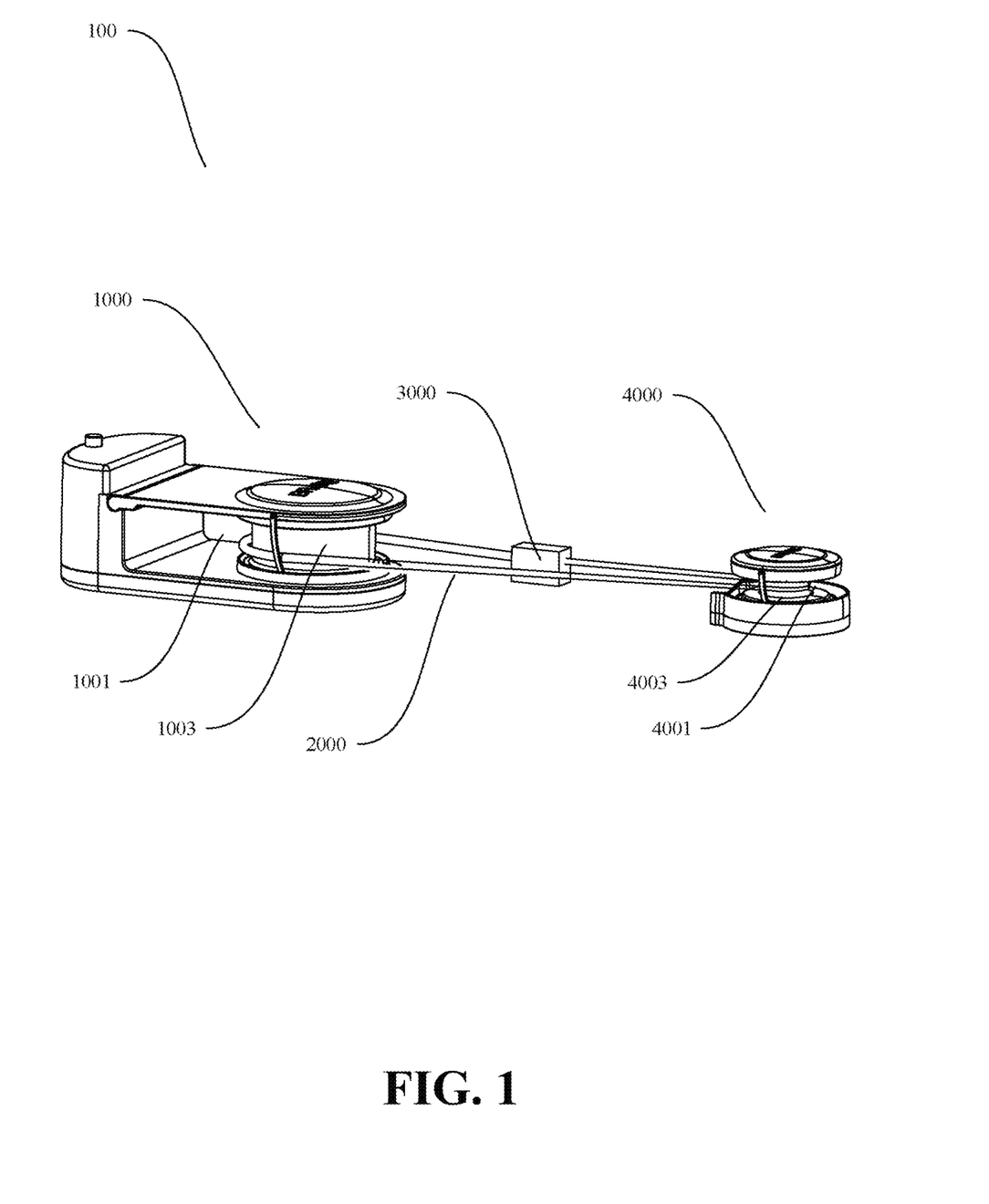
FIG. 1 is a schematic diagram of an overall structure of the present invention.

In this embodiment, a length range of the flexible bait line 2000 is 1 mm-1500000 mm.

In this embodiment, a width range of the flexible bait line 2000 is 0.01 mm-10 mm.

In this embodiment, the flexible bait line 2000 is a nylon bait line. The nylon bait line has good flexibility, can be easily bent and moved, and adapts to various actions of a pet. At the same time, the nylon bait line keeps smooth, and is not easily tangled or knotted, enhancing the interaction experience between the pet and a toy. In addition, nylon material has high strength and wear resistance. The pet may apply considerable pulling forces while playing. The nylon bait line can withstand these forces and reduce the risk of breakage, thereby extending an overall service life of the toy.

In other embodiments, the flexible bait line 2000 is a polyester bait line. This type of line is durable and has good elasticity, making it very suitable for the pet to chase and pull repeatedly. In another embodiment, the flexible bait line 2000 is a polyethylene bait line. A polyethylene line is lightweight and has high strength, and can withstand pet scratching and biting. In other embodiments, the flexible bait line 2000 can also be a hemp bait line. The hemp bait line has high strength and durability, is not easy to break, can withstand large pulling forces, and also has good flexibility, so that the actions of the bait can be naturally imitated, and attraction and effectiveness are improved.

In this embodiment, the bait 3000 is detachably connected to the flexible bait line 2000, allowing a user to easily replace the bait 3000 of different types, shapes, or sizes.

In this embodiment, the bait 3000 is a nylon plastic bait, a fabric bait, a plush bait, or a bagged bait. The nylon plastic bait has excellent durability and wear resistance, allowing the bait to maintain a good condition during long-term use. Fabric material is soft and more friendly to the pet's teeth and mouth, reducing the risk of injury. Plush material is soft and comfortable, making the pet enjoy playing more and helping to reduce anxiety and stress. The bagged bait can be filled with various substances that attract the pet, such as catnip, dog snacks, etc., to increase the pet's interest and participation in the toy.

In other embodiments, the bait 3000 is a rubber bait. Rubber material is soft and elastic, and can bear biting and pulling of the pet without causing damage to the pet's teeth.

In this embodiment, a weight range of the bait 3000 is 0.1 g-5000 g.

In this embodiment, the bait 3000 is a long strip shaped bait, a spherical bait, a cylindrical bait, a triangular bait, or a polygonal bait. Different shapes of baits can simulate different actions and postures, effectively increasing the pet's interest and participation in the toy.

In other embodiments, the bait 3000 is a pendant bait. The pendant bait can be hung at different heights or positions to increase the pet's curiosity and desire to play. The pendant bait can mimic a hanging state of prey, attracting the pet to chase and capture. Moreover, the pendant bait can encourage the pet to perform more jumping, flapping, scratching and other actions, thereby increasing interactivity and amount of exercise, and facilitating the health and exercise of the pet.

Figure 2:
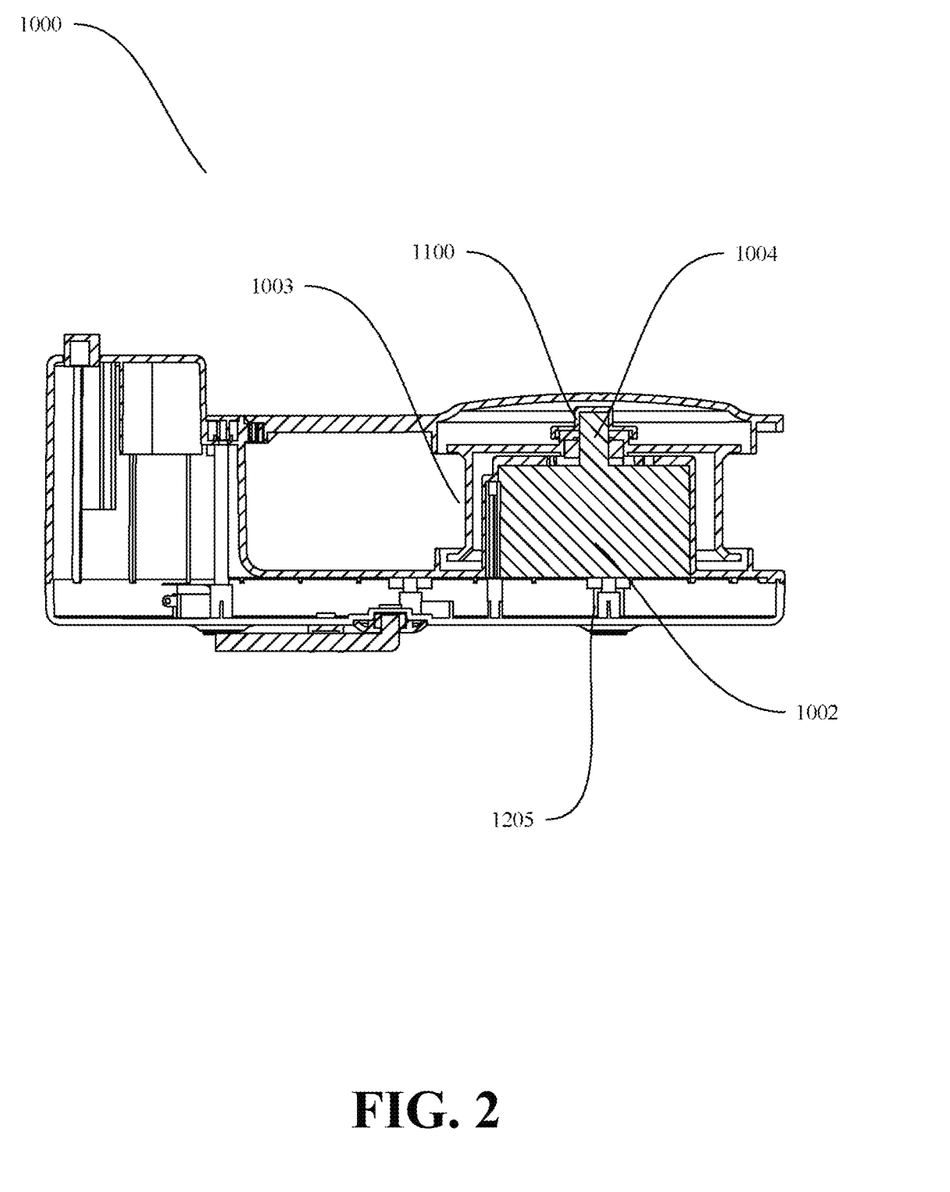
FIG. 2 is a schematic diagram of a cross-sectional structure of one embodiment of a driving device in the present invention.
Figure 3:
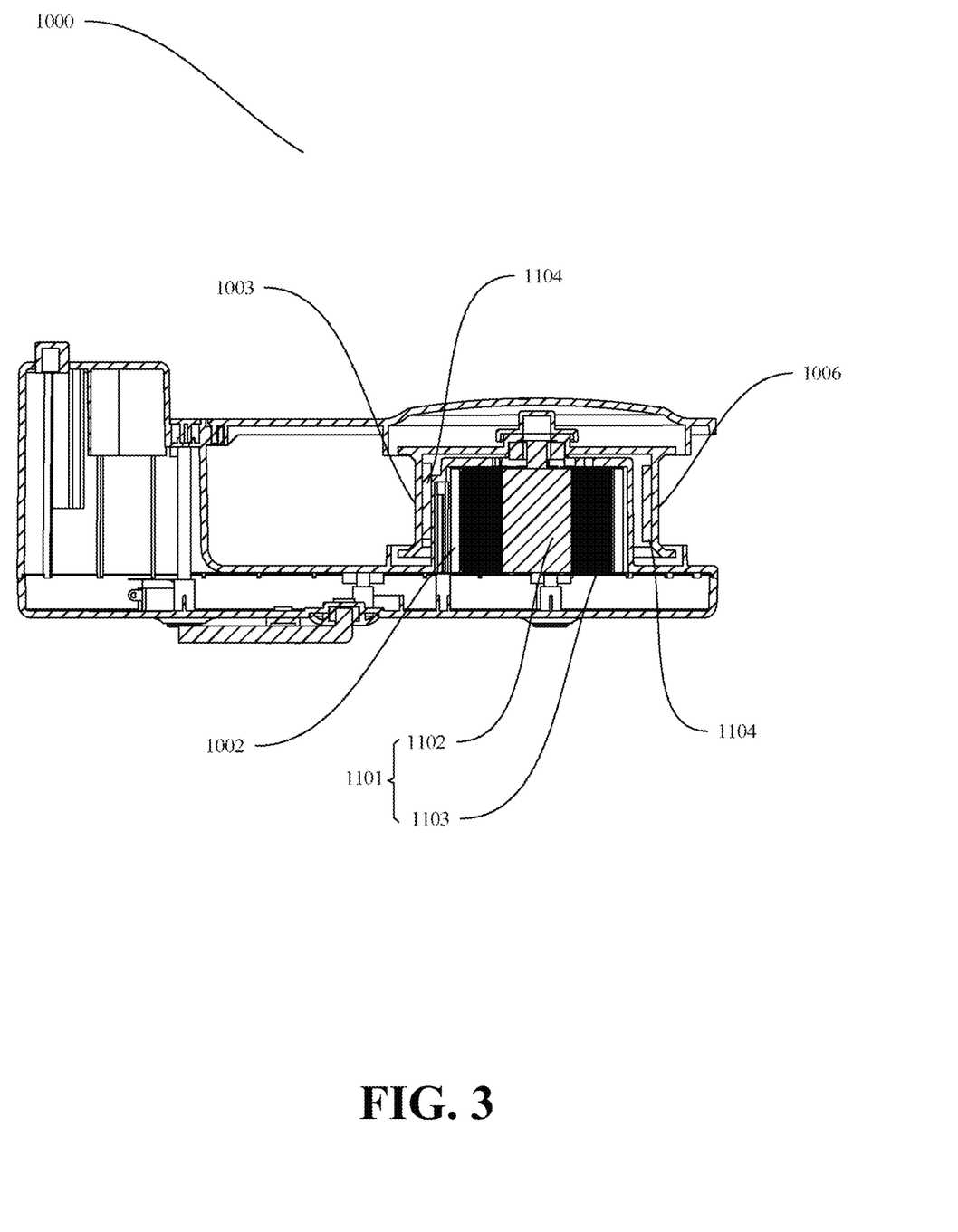
FIG. 3 is a schematic diagram of a cross-sectional structure of another embodiment of a driving device in the present invention.

In this embodiment, referring to FIGS. 2-3, the driving device 1000 includes a motor 1002 and a driving wheel 1003. The motor 1002 and the driving wheel 1003 are electrically connected, so that the motor 1002 is capable of driving the driving wheel 1003 to rotate.

As a preferred option of this embodiment, as shown in FIG. 2, the motor 1002 is provided with an output shaft 1004. The motor 1002 is arranged inside the driving wheel 1003, and the output shaft 1004 is connected to the driving wheel 1003. Specifically, the driving wheel 1003 is provided with an installation portion 1100, and the output shaft 1004 is installed on the installation portion 1100, so that the motor 1002 drives the driving wheel 1003 to rotate.

As another preferred option of this embodiment, as shown in FIG. 3, the motor 1002 is a brushless motor. Specifically, the brushless motor includes a stator component 1101. The stator component 1101 includes at least one stator core 1102 and a stator winding 1103 wound around the stator core 1102. A permanent magnet 1104 is arranged on an inner side wall of the driving wheel 1003. A magnetic field generated by the stator winding 1103 drives the permanent magnet 1104 to rotate, so that the permanent magnet 1104 drives the driving wheel 1003 to rotate. The present invention adopts the brushless motor 1002, which has higher electrical energy conversion efficiency compared with a brush motor 1002, and can more effectively convert electrical energy into mechanical energy.

Figure 4:
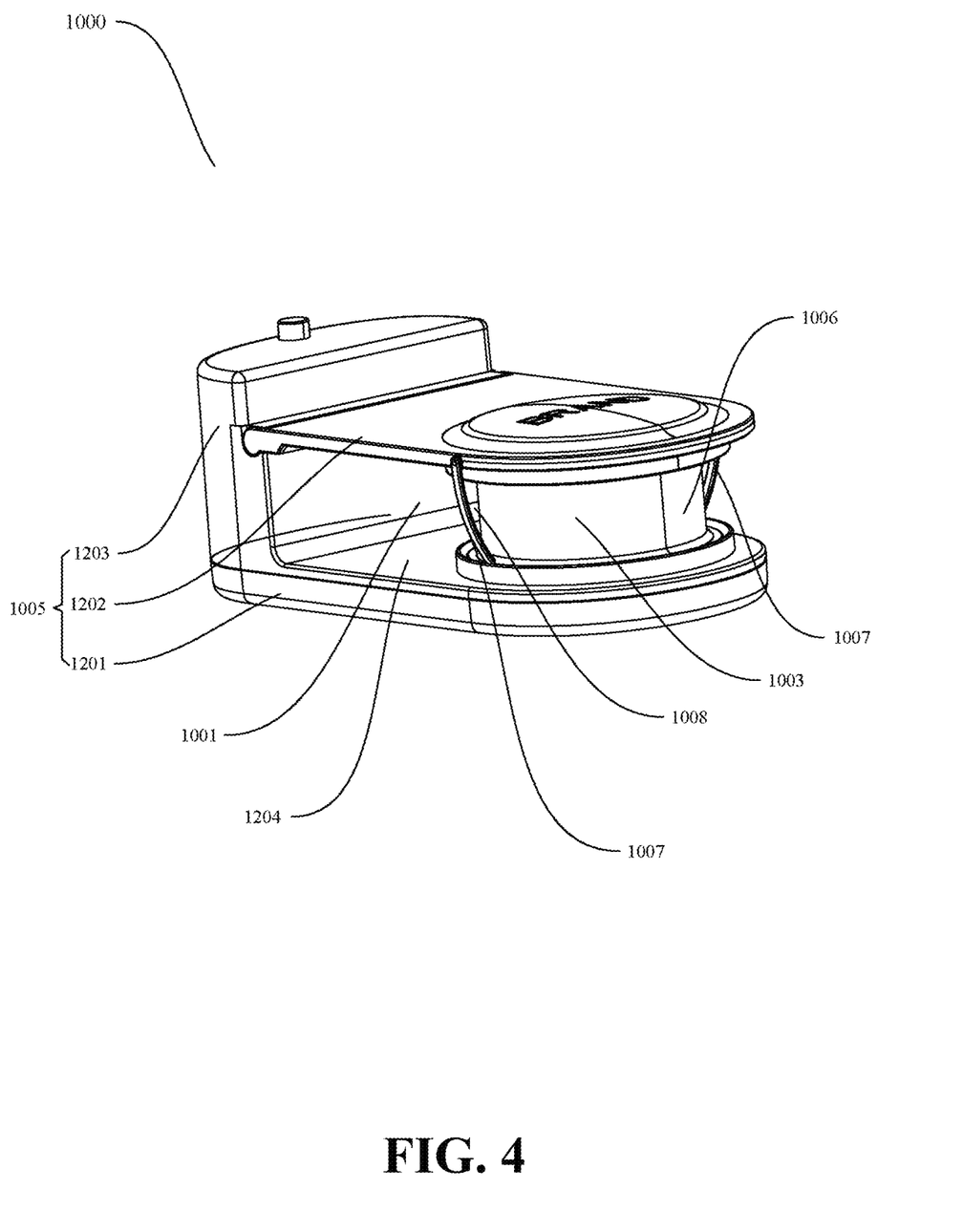
FIG. 4 is a schematic diagram of a structure of a driving device in the present invention.

In this embodiment, as shown in FIG. 4, the driving device 1000 further includes a driving housing 1005. The driving wheel 1003 is arranged inside the driving housing 1005. The first movement window 1001 for allowing the flexible bait line 2000 to drive the bait 3000 to freely pass through is provided between the driving wheel 1003 and the driving housing 1005. The driving housing 1005 effectively prevents dust, moisture, debris, and the like in an external environment from entering an inner part of the driving device 1000, thereby reducing the risk of malfunctions caused by pollution or damage. At the same time, the risk of injury caused by direct contact with the high-speed rotating driving wheel 1003 can also be reduced. The design of the first movement window 1001 in this embodiment allows the flexible bait line 2000 to smoothly pass through under the action of the driving wheel 1003, ensuring that the bait 3000 can move freely according to a predetermined trajectory and speed.

In this embodiment, the driving housing 1005 includes a first base 1201, a first top cover 1202, and a first side wall 1203. The first side wall 1203 is connected to the first base 1201 and the first top cover 1202. A first installation space 1204 is defined between the first top cover 1202, the first base 1201, and the first side wall 1203. The driving wheel 1003 is installed in the first installation space 1204 and is rotatable relative to the driving housing 1005. A power supply 1205 is provided inside the first base 1201. The power supply 1205 is electrically connected to the motor 1002 to drive the driving wheel 1003 to rotate. The first movement window 1001 is formed between the first side wall 1203 and the driving wheel.

In this embodiment, a first circumferential groove 1006 is defined in the driving wheel 1003. The first circumferential groove 1006 is used for fixing the flexible bait line 2000 that rotates around the driving wheel 1003 when the driving wheel 1003 rotates. The first circumferential groove 1006 is capable of tightly abutting against the flexible bait line 2000, reducing the sliding friction between the line and the driving wheel 1003, thereby improving energy transfer efficiency. That is, under an identical driving force, the driving wheel 1003 can more effectively drive the flexible bait line 2000 to rotate, thereby driving the bait 3000 to move faster and more stably.

In this embodiment, the driving housing 1005 is provided with at least one first position limiting blocking plate 1007. A first position limiting space 1008 is surrounded and formed between the first position limiting blocking plate and the first circumferential groove 1006. The first position limiting space 1008 is used for limiting the orderly movement of the flexible bait line 2000 along a trajectory of the first circumferential groove 1006, and ensuring that the flexible bait line 2000 does not deviate from a predetermined path due to external forces during rotation. One end of the first position limiting blocking plate 1007 is connected to a side wall edge of the first top cover 1202, and an opposite end of the first position limiting blocking plate 1007 is connected to the first base 1201. As a preferred option of this embodiment, a total number of the first position limiting blocking plates 1007 is two, and the two first position limiting blocking plates 1007 are arranged opposite to each other at two side edges of the driving housing 1005. The first position limiting blocking plate 1007 has an arc-shaped structure.

Figure 5:
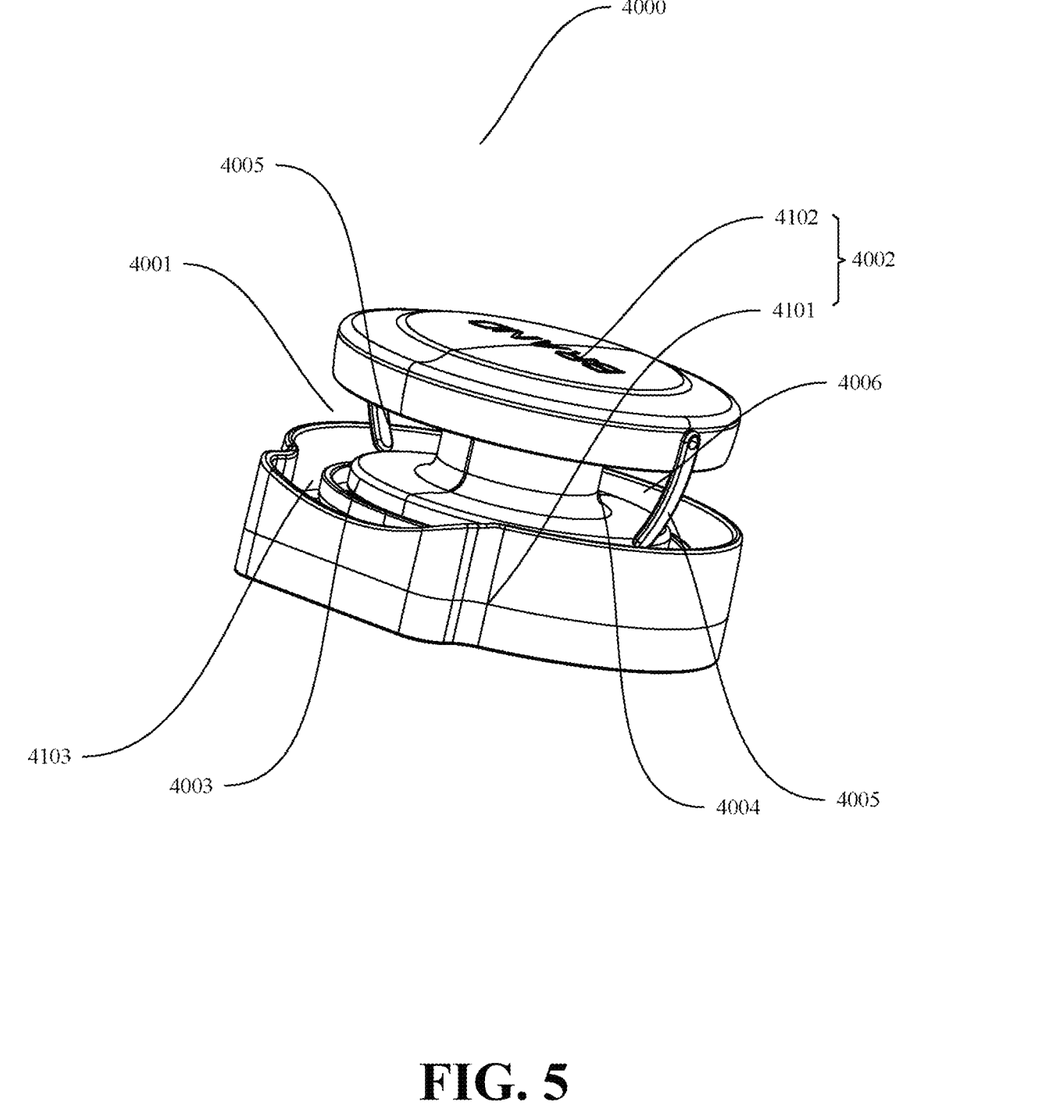
FIG. 5 is a schematic diagram of a structure of a transmission device in the present invention.

The bait chasing system 100 of the present invention further includes a transmission device 4000, as shown in FIG. 5. The flexible bait line 2000 is coupled with the driving device 1000 and the transmission device 4000 to form an annular structure, so that the flexible bait line is continuously rotatable around the driving device 1000 and the transmission device 4000. The flexible bait line 2000 of the annular structure continuously rotates under the joint action of the driving device 1000 and the transmission device 4000, which not only improves the dynamic effect and trapping efficiency of the bait 3000, but also enhances the stability and adaptability of the system.

In this embodiment, the transmission device 4000 is provided with a second movement window 4001. The first movement window 1001 and the second movement window 4001 are configured for allowing the flexible bait line 2000 to be continuously rotatable around the driving device 1000 and the transmission device 4000, thereby ensuring smooth operation of the system, and making the replacement of the bait 3000 and the maintenance of the system easier.

In this embodiment, the transmission device 4000 includes a transmission housing 4002 and a transmission wheel 4003 arranged inside the transmission housing 4002. A second circumferential groove 4004 is defined in the transmission wheel 4003. The second circumferential groove 4004 is used for fixing the flexible bait line 2000 that rotates around the transmission wheel 4003 when the transmission wheel 4003 rotates. The second circumferential groove 4004 enables the flexible bait line 2000 to be stably fixed when rotating around the transmission wheel 4003, reducing system instability and efficiency reduction caused by sliding or displacement of the flexible bait line 2000.

In this embodiment, the transmission housing 4002 is provided with at least one second position limiting blocking plate 4005. A second position limiting space 4006 is surrounded and formed between the second position limiting blocking plate 4005 and the second circumferential groove 4004. The second position limiting space 4006 is used for limiting the orderly movement of the flexible bait line 2000 along a trajectory of the second circumferential groove 4004. In this embodiment, the transmission housing 4002 is provided with a second base 4101 and a second top cover 4102. A second installation space 4103 is defined between the second base 4101 and the second top cover 4102. The transmission wheel 4003 is installed in the second installation space 4103 and is rotatable relative to the transmission housing 4002. One end of the second position limiting blocking plate 4005 is connected to an edge of the second top cover 4102, and an opposite end of the second position limiting blocking plate 4005 is connected to the second base 4101, so that the second position limiting blocking plate 4005 and the second circumferential groove 4004 surround and form the second position limiting space 4006. As a preferred option of this embodiment, the transmission housing 4002 is provided with two second position limiting blocking plates 4005, and the second position limiting blocking plate 4005 has an arc-shaped structure.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A bait chasing system, comprising:
a driving device, wherein the driving device is provided with a first movement window; and
a flexible bait line, wherein the flexible bait line is used for connecting a bait, and the flexible bait line is wound around the driving device and is continuously rotatable around the driving device;
wherein the first movement window is configured for allowing the flexible bait line to drive the bait to freely pass through when the flexible bait line rotates around the driving device.

2. The bait chasing system according to claim 1, wherein a length range of the flexible bait line is 1 mm-1500000 mm.

3. The bait chasing system according to claim 1, wherein a width range of the flexible bait line is 0.01 mm-10 mm.

4. The bait chasing system according to claim 1, wherein the flexible bait line is a nylon bait line, a hemp bait line, or a polyester bait line.

5. The bait chasing system according to claim 1, wherein the bait is detachably connected to the flexible bait line.

6. The bait chasing system according to claim 5, wherein the bait is a nylon plastic bait, a fabric bait, a plush bait, or a bagged bait.

7. The bait chasing system according to claim 5, wherein a weight range of the bait is 0.1 g-5000 g.

8. The bait chasing system according to claim 5, wherein the bait is a long strip shaped bait, a spherical bait, a cylindrical bait, a triangular bait, or a polygonal bait.

9. The bait chasing system according to claim 5, wherein the bait is a pendant bait.

10. The bait chasing system according to claim 1, wherein the driving device comprises a motor and a driving wheel, and the motor is capable of driving the driving wheel to rotate.

11. The bait chasing system according to claim 10, wherein the motor is provided with an output shaft, the motor is arranged inside the driving wheel, and the output shaft is connected to the driving wheel, so that the motor drives the driving wheel to rotate.

12. The bait chasing system according to claim 10, wherein the motor is a brushless motor.

13. The bait chasing system according to claim 1, wherein the bait chasing system further comprises at least one transmission device, and the flexible bait line is coupled with the driving device and the transmission device to form an annular structure, so that the flexible bait line is continuously rotatable around the driving device and the transmission device.

14. The bait chasing system according to claim 13, wherein the transmission device is provided with a second movement window, and the second movement window is configured for allowing the flexible bait line to drive the bait to freely pass through when the flexible bait line is continuously rotatable around the driving device and the transmission device.

15. The bait chasing system according to claim 14, wherein the transmission device comprises a transmission housing and a transmission wheel arranged inside the transmission housing, a second circumferential groove is defined in an outer side wall of the transmission wheel, the second circumferential groove is used for fixing the flexible bait line that rotates around the transmission wheel when the transmission wheel rotates, the transmission housing is also provided with at least one second position limiting blocking plate, a second position limiting space is surrounded and formed between the second position limiting blocking plate and the second circumferential groove, and the second position limiting space is used for limiting movement of the flexible bait line along a trajectory of the second circumferential groove.

16. The bait chasing system according to claim 12, wherein the brushless motor comprises a stator component, and the stator component comprises at least one stator core and a stator winding wound around the stator core.

17. The bait chasing system according to claim 16, wherein a permanent magnet is arranged on an inner side wall of the driving wheel, and a magnetic field generated by the stator winding drives the permanent magnet to rotate, so that the permanent magnet drives the driving wheel to rotate.

18. The bait chasing system according to claim 17, wherein the driving device further comprises a driving housing, the driving wheel is arranged inside the driving housing, and the first movement window for allowing the flexible bait line to drive the bait to freely pass through is provided between the driving wheel and the driving housing.

19. The bait chasing system according to claim 18, wherein a first circumferential groove is defined in an outer side wall of the driving wheel, and the first circumferential groove is used for fixing the flexible bait line that rotates around the driving wheel when the driving wheel rotates.

20. The bait chasing system according to claim 19, wherein the driving housing is provided with at least one first position limiting blocking plate, a first position limiting space is surrounded and formed between the first position limiting blocking plate and the first circumferential groove, and the first position limiting space is used for limiting movement of the flexible bait line along a trajectory of the first circumferential groove.

\* \* \* \* \*